United States Patent
Gorman

(10) Patent No.: US 9,992,679 B1
(45) Date of Patent: Jun. 5, 2018

(54) INTEGRATED AUTHENTICATION CODES FOR USER DEVICES AND COMMUNICATION NETWORKS

(71) Applicant: Sprint Communications Company L.P., Overland Park, KS (US)

(72) Inventor: Pierce Andrew Gorman, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/247,035

(22) Filed: Aug. 25, 2016

(51) Int. Cl.
| | |
|---|---|
| *H04W 12/06* | (2009.01) |
| *H04M 3/42* | (2006.01) |
| *H04L 29/06* | (2006.01) |

(52) U.S. Cl.
CPC ....... *H04W 12/06* (2013.01); *H04M 3/42059* (2013.01); *H04L 65/1006* (2013.01)

(58) Field of Classification Search
CPC ..... H04W 12/06; H04W 12/04; H04W 84/12; H04W 80/04
USPC ............... 455/410, 411, 414.1; 370/352, 389
See application file for complete search history.

(56) References Cited

U.S. PATENT DOCUMENTS

| | | | |
|---|---|---|---|
| 7,240,366 B2 | 7/2007 | Buch et al. | |
| 7,448,072 B2 | 11/2008 | Faccin et al. | |
| 7,484,240 B2 | 1/2009 | Faccin et al. | |
| 7,529,359 B2 | 5/2009 | Gallant et al. | |
| 7,565,547 B2 | 7/2009 | Matta et al. | |
| 7,568,224 B1 | 7/2009 | Jennings et al. | |
| 7,920,520 B2 | 4/2011 | Zreiq et al. | |
| 8,135,119 B1 | 3/2012 | Zhao et al. | |
| 8,254,541 B2 | 8/2012 | Cai | |
| 8,689,301 B2 | 4/2014 | Boyle et al. | |
| 8,763,081 B2 | 6/2014 | Bogdanovic et al. | |
| 8,774,379 B1 | 7/2014 | Youngs et al. | |
| 9,060,057 B1 | 6/2015 | Danis | |
| 2004/0008666 A1* | 1/2004 | Hardjono | ............ H04L 63/0823 370/352 |
| 2005/0220095 A1* | 10/2005 | Narayanan | ............ H04L 63/126 370/389 |
| 2013/0212646 A1 | 8/2013 | McFarland et al. | |

* cited by examiner

*Primary Examiner* — Sam Bhattacharya

(57) ABSTRACT

User Equipment (UE) transfers a session request having a calling party identifier and a digital signature for the calling party identifier. An originating network receives the session request and digitally verifies the calling party digital signature for the calling party identifier. The originating network transfers the session request having the calling party identifier, a user code indicating that the calling party identifier was digitally verified by the originating network, and an originating network digital signature for the originating network. A tandem network receives the session request having the originating network digital signature and digitally verifies the originating network digital signature. The tandem network transfers the communication session request having the calling party identifier and a user/network code indicating that the calling party identifier was digitally verified by the originating communication network and that the originating network was digitally verified by the tandem communication network.

18 Claims, 10 Drawing Sheets

US 9,992,679 B1

INTEGRATED AUTHENTICATION CODES FOR USER DEVICES AND COMMUNICATION NETWORKS

TECHNICAL BACKGROUND

Data communication networks exchange user data with User Equipment (UE) to provide various data communication services. The UE may be a phone, computer, media player, and the like. The data communication services may be Internet access, voice calling, video conferencing, or some other computerized information service. On a typical data communication session, multiple communication networks may be used. For example, there may be an originating network, a terminating network, and a tandem network that couples the originating network to the terminating network.

Many data communication networks authenticate their UEs with private/public key data exchanges or hardware root of trust data exchanges. The communication networks typically host user authentication data in an authentication controller. Some communication networks do not authenticate UEs. For example, a public Wireless Fidelity (WIFI) network may not authenticate users.

Many data communication networks authenticate each other with private/public key data exchanges or hardware root of trust data exchanges. The communication networks typically host network authentication data in an authentication controller. Some communication networks do not authenticate other networks. For example, a small internet-based telephony network may not authenticate other networks.

In scenarios where a data communication session spans multiple communication networks, user authentications may be shared among the serving communication networks. Unfortunately, the shared user authentication data is not efficiently aggregated with communication network authentication data. The communication networking technology to efficiently and effectively share both user authentication data and network authentication data is currently lacking.

TECHNICAL OVERVIEW

User Equipment (UE) transfers a communication session request having a calling party identifier and a digital signature for the calling party identifier. An originating communication network receives the communication session request and digitally verifies the calling party digital signature for the calling party identifier. The originating communication network transfers the communication session request having the calling party identifier, a user code indicating that the calling party identifier was digitally verified by the originating communication network, and an originating communication network digital signature for the originating communication network. A tandem communication network receives the session request having the originating network digital signature and digitally verifies the originating network digital signature. The tandem communication network transfers the communication session request having the calling party identifier and a user/network code indicating that the calling party identifier was digitally verified by the originating communication network and that the originating network was digitally verified by the tandem communication network.

DETAILED DESCRIPTION

Figure 1:
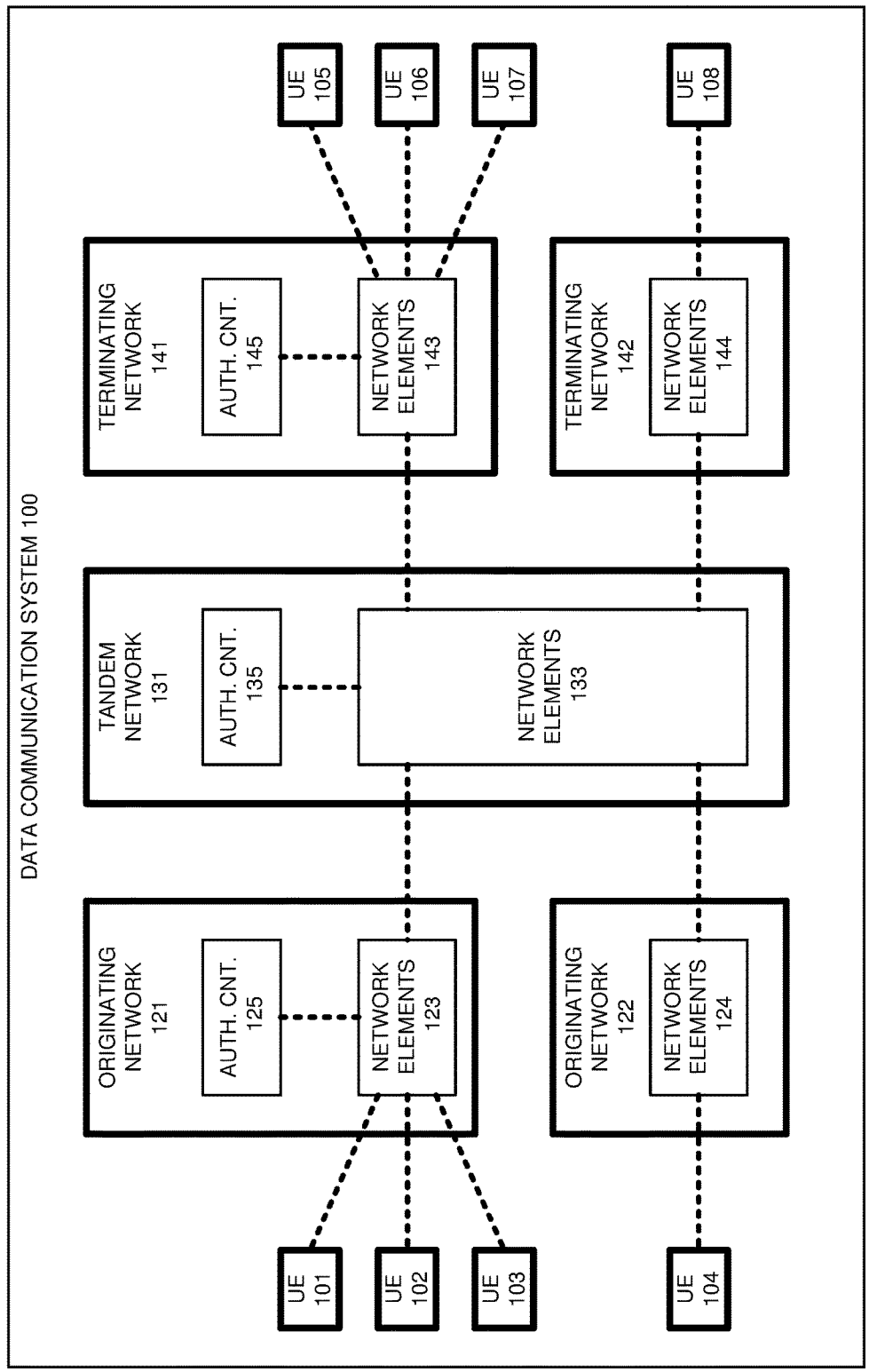
FIGS. 1-9 illustrate a data communication system to generate and transfer authentication codes for User Equipment (UE) and communication networks.

FIGS. 1-9 illustrate data communication system 100 to generate and transfer authentication codes for User Equipment (UEs) 101-108 and communication networks 121-122 and 141-142. Data communication system 100 comprises: UEs 101-108, originating communication networks 121-122, tandem communication network 131, and terminating communication networks 141-142. UEs 101-108 comprise computers, phones, media players, or some other intelligent machines with data communication transceivers.

Networks 121-122, 131, and 141-142 include respective network elements 123-124, 133, and 143-144. Network elements 123-124, 133, and 143-144 comprise data access points, gateways, routers, databases, controllers, and the like. Network elements 123-124, 133, and 143-144 use communication protocols like Ethernet, Internet Protocol (IP), Data Over Cable System Interface Specification (DOCSIS), Wave Division Multiplex (WDM), Long Term Evolution (LTE), Wireless Fidelity (WIFI), LTE/WIFI Aggregation (LWA), and/or 5G Millimeter Wave (mmW) access. Networks 121, 131, and 141 include respective network authentication controllers 125, 135, and 145. Network authentication controllers 125, 135, and 145 comprises data processing circuitry, data memory, data communication transceivers, and operating software.

UEs 101-104 transfer communication session requests that have their respective calling party identifiers. The communication session requests may comprise Session Initiation Protocol (SIP) messages. The calling party identifiers typically comprise UE telephone numbers, but other addresses, numbers, or names for the UEs could be used. Some of the communication session requests also have calling party digital signatures for their calling party identifiers, but some of the communication session requests do not include digital signatures for calling party identifiers. Originating communication networks 121-122 receive the communication session requests from originating UEs 101-104.

Originating communication network 121 verifies the calling party digital signatures for the associated calling party identifiers. Various techniques could be used to verify the calling party digital signatures, such as public/private key data exchanges, hardware root-of-trust data exchanges, and the like. Originating communication network 121 transfers the communication session requests having the calling party identifiers and originating network digital signatures. The communication session requests from originating network 121 also have user codes that indicate whether the calling party digital signatures for the calling party identifiers were verified by originating communication network 121. The user codes could each be one or two bits long if desired.

Originating communication network 122 does not verify calling party digital signatures for calling party identifiers. Originating communication network 122 transfers the communication session requests having the calling party identifiers but without any originating network digital signatures. The communication session requests from network 122 do not have user codes that indicate whether the calling party digital signatures for the calling party identifiers were verified by originating communication network 122.

Tandem communication network 131 receives the communication session requests from originating communication networks 121-122. Tandem communication network 131 verifies the originating network digital signatures for originating communication network 121. Various techniques could be used to verify the originating network digital signatures, such as public/private key data exchanges, hardware root-of-trust data exchanges, and the like. Tandem communication network 131 transfers the communication session requests having the calling party identifiers and having user/network codes indicating whether the calling party digital signatures for the calling party identifiers were verified by originating communication networks 121-122 and whether the originating network digital signatures were verified by tandem communication network 131. These user/network codes could each be one or two bits long if desired.

For unsigned calling party identifiers, tandem communication network 131 verifies the calling party identifiers against a set of trusted criteria. For example, the calling party identifier may be in a valid calling number block. A valid calling number block comprises a set of telephony numbers that were issued by a trusted authority to a known entity. For example, a telephony carrier may issue a block of telephony numbers to a trusted business or government agency. Also, the telephony carrier may recognize a block of non-sequential of telephony numbers that are served by another trusted telephony carrier. Tandem communication network 131 generates and transfers user/network codes that indicate whether the communication session requests have calling party identifiers from a valid calling number block and whether the originating network digital signature was verified by the tandem communication network. These user/network codes could each be one or two bits long if desired.

In some alternative examples, one or more of UEs 101-108 may verify the calling party digital signatures for the calling party identifiers and indicate the verifications with the user codes in their subsequent session signaling. Likewise, tandem communication network 131 and/or terminating communication network 141 may verify the calling party digital signatures for the calling party identifiers and indicate the verifications with the user codes in their subsequent session signaling. One or more of UEs 101-108 may verify the originating network digital signatures for originating communication network 121 and indicate the verifications with the user/network codes in their subsequent session signaling. Terminating communication network 141 may verify the originating network digital signatures and indicate the verifications with the user/network codes in its subsequent session signaling. Originating communication network 121 may self-verify its originating network digital signatures and indicate the verifications with the user/network codes in its subsequent session signaling. One or more of UEs 101-108, originating communication network 121, and/or terminating communication network 141 may apply criteria to identify calling party identifiers from valid number blocks and indicate these type of verifications with the user/network codes in subsequent session signaling.

Note that originating network 121 and/or terminating network 141 may be omitted. Thus, tandem network 131 could also be the originating network and perform the tasks described herein for originating network 121. Likewise, tandem network 131 could be the terminating network and perform the tasks described herein for terminating network 141. Tandem network 131 may perform the origination and termination tasks of both networks 121 and 141. Thus, the term "tandem" indicates a network positioned between UEs (and not necessarily between networks).

Thus, any of the UEs and/or the communication networks may generate and transfer the user/network codes that indicate if the calling party identifiers and/or the originating networks have valid digital signatures—or if the if the calling party identifiers are from valid number blocks. In an exemplary coding scheme, tandem communication network 131 (or another network or UE) may use the following user/network codes as follows. The user/network code "11" means the communication session request has a valid originating network digital signature and the calling party identifier has a valid user digital signature. The user/network code "01" means the communication session request has a valid originating network digital signature, but the calling party identifier does not have a valid user digital signature. The user/network code "10" means the communication session request has a valid originating network digital signature, and the calling party identifier is from a valid calling number block, but the calling party identifier does not have a valid user digital signature. The user/network code "00" means the communication session request does not have a valid originating network digital signature, the calling party identifier does not have a valid user digital signature, and the calling party identifier is not from a valid calling number block.

In response to the communication session requests, UEs 105-108 transfer communication session OKs that have their respective called party identifiers. The communication session OKs may also comprise SIP messages. The called party identifiers typically comprise UE telephone numbers, but other addresses, numbers, or names for the UEs could be used. Some of the communication session OKs have called party digital signatures for their called party identifiers, but some of the communication session OKs do not include digital signatures for the called party identifiers. Terminating communication networks 141-142 receive the communication session OKs from terminating UEs 105-108.

Terminating communication network 141 verifies the called party digital signatures for the associated called party identifiers. Various techniques could be used to verify the called party digital signatures, such as public/private key data exchanges, hardware root-of-trust data exchanges, and the like. Terminating communication network 141 transfers the communication session OKs having the called party identifiers and terminating network digital signatures. The communication session requests from terminating network 141 also have user codes that indicate whether the called party digital signatures for the called party identifiers were verified by terminating communication network 141. The user codes could each be one or two bits long if desired. Tandem communication network 131 could also perform this task.

Terminating communication network 142 does not verify called party digital signatures for called party identifiers. Terminating communication network 142 transfers the communication session OKs having the called party identifiers but without any terminating network digital signatures. The communication session OKs from terminating communication network 142 do not have user codes that indicate whether the called party digital signatures for the called party identifiers were verified by terminating network 142.

Tandem communication network 131 receives the communication session OKs from terminating communication networks 141-142. Tandem communication network 131 verifies the terminating network digital signatures for terminating communication network 141. Tandem communication network 131 transfers the communication session OKs having the called party identifiers and having user/ network codes indicating whether the called party digital signatures for the called party identifiers were verified by terminating communication networks 141-142 and whether the terminating network digital signatures were verified by tandem communication network 131. These user/network codes could each be one or two bits long if desired.

For unsigned called party identifiers, tandem communication network 131 verifies the called party identifiers against valid calling number blocks. Valid calling number blocks comprise sets of telephony numbers that were issued by a trusted authority to known entities. Tandem communication network 131 generates and transfers user/network codes that indicate whether the communication session OKs have called party identifiers from a valid calling number block and whether the terminating network digital signature was verified by tandem communication network 131. These user/network codes could each be one or two bits long if desired.

In some alternative examples, one or more of UEs 101-108 may verify the called party digital signatures for the called party identifiers and indicate the verifications with the user codes in their subsequent session signaling. Likewise, tandem communication network 131 and/or originating communication network 121 may verify the called party digital signatures for the called party identifiers and indicate the verifications with the user codes in their subsequent session signaling. One or more of UEs 101-108 may verify the terminating network digital signatures for terminating communication network 141 and indicate the verifications with the user/network codes in their subsequent session signaling. Originating communication network 121 may verify the terminating network digital signatures and indicate the verifications with the user/network codes in its subsequent session signaling. Terminating communication network 141 may self-verify its terminating network digital signatures and indicate the verifications with the user/network codes in its subsequent session signaling. One or more of UEs 101-108, originating communication network 121, and/or terminating communication network 141 may apply criteria to identify called party identifiers from valid number blocks indicate these type of verifications with the user/network codes in subsequent session signaling.

Note that originating network 121 and/or terminating network 141 may be omitted. Thus, tandem network 131 could also be the originating network and perform the tasks described herein for originating network 121. Likewise, tandem network 131 could be the terminating network and perform the tasks described herein for terminating network 141. Tandem network 131 may perform the origination and termination tasks of both networks 121 and 141.

Thus, any of the UEs and/or the communication networks may generate and transfer the user/network codes that indicate if the called party identifiers and/or the terminating networks have valid digital signatures—or if the if the called party identifiers are from valid number blocks. In an exemplary coding scheme, tandem communication network 131 (or another network or UE) may use the following user/network codes as follows. The user/network code "11" means the communication session request has a valid terminating network digital signature and the called party identifier has a valid user digital signature. The user/network code "01" means the communication session request has a valid terminating network digital signature, but the called party identifier does not have a valid user digital signature. The user/network code "10" means the communication session request has a valid terminating network digital signature, and the called party identifier is from a valid calling number block, but the called party identifier does not have a valid user digital signature. The user/network code "00" means the communication session request does not have a valid terminating network digital signature, the called party identifier does not have a valid user digital signature, and the called party identifier is not from a valid calling number block.

FIGS. 2-9 illustrate exemplary communication sessions with three networks, but one, two, or many networks could be used in other examples. In addition, the systems that verify digital signatures and valid numbers for calling party identifiers, called party identifiers, originating networks, and terminating networks may vary from those used this example.

Figure 2:
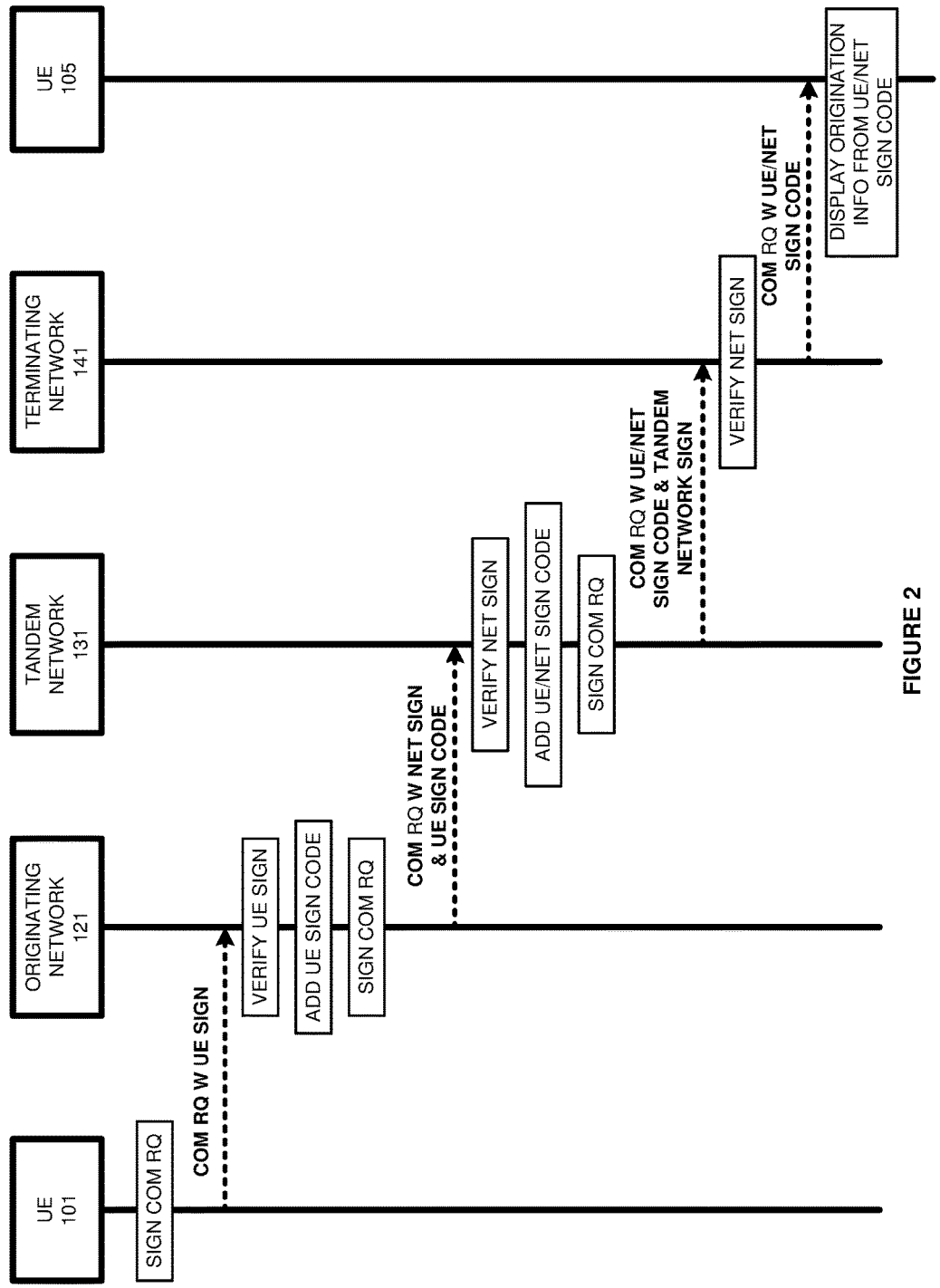
Figure 3:
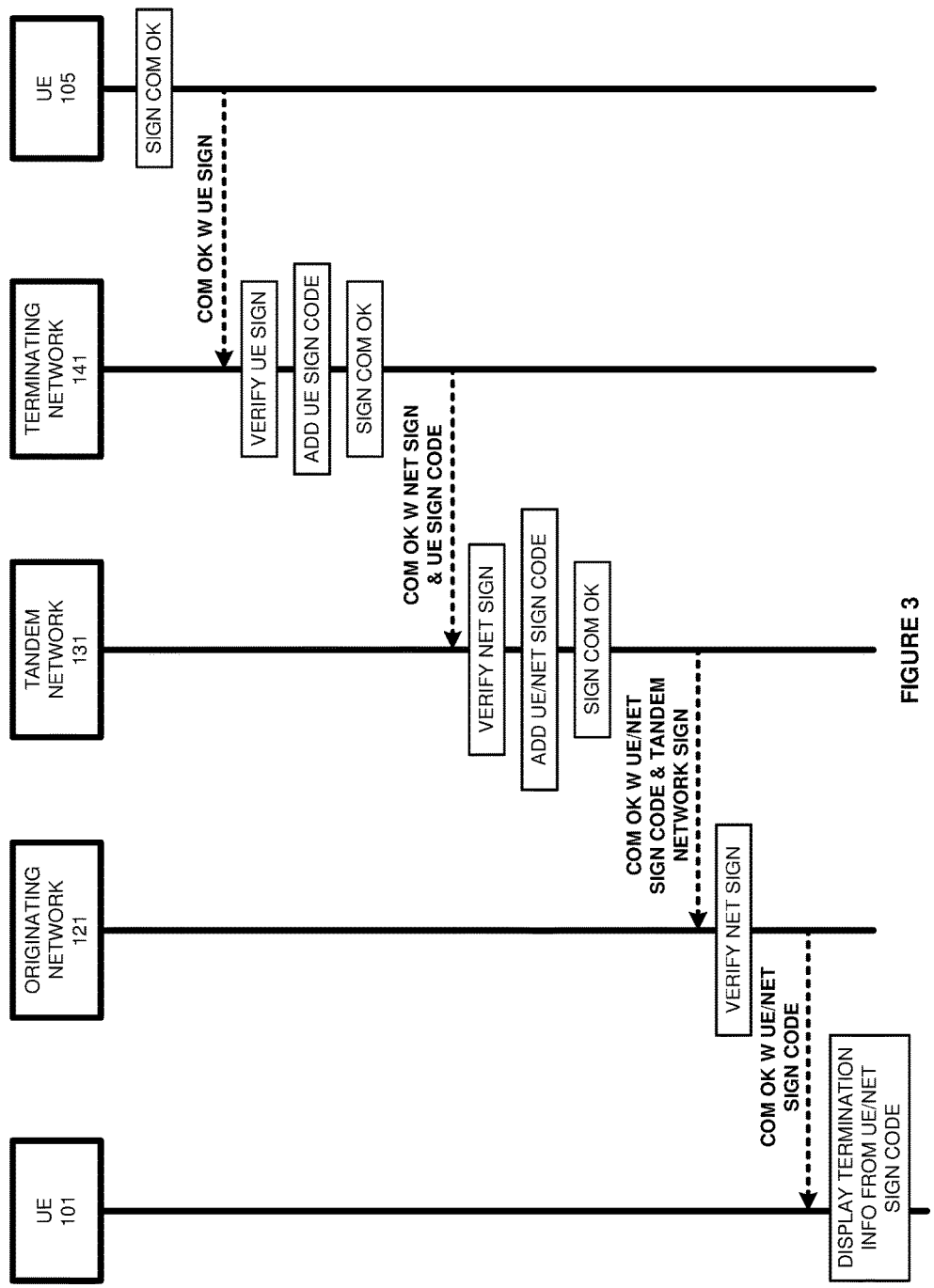

FIGS. 2-3 illustrate a first exemplary communication session. Referring to FIG. 2, UE 101 transfers a communication session request that has a calling party identifier for UE 101 and a called party identifier for UE 105. The communication session request may comprise a SIP Invite message. UE 101 digitally signs the calling party identifier in the communication session request with its private key. UE 101 transfers the communication session request having the calling party identifier digital signature (UE SIGN) to originating communication network 121.

Originating communication network 121 verifies the calling party digital signature for the calling party identifier using the appropriate public key. Originating communication network 121 adds a user code (UE SIGN CODE) to the communication session request that indicates that the calling party digital signature for the calling party identifier was verified by originating communication network 121. For example, originating communication network 121 may add a "1" to a SIP Invite header to indicate that the calling party identifier was digitally verified. Originating communication network 121 digitally signs the communication session request with its private key. Originating communication network 121 transfers the communication session request having the calling party identifier, the called party identifier, user code, and originating network digital signature (NET SIGN) to tandem communication network 131.

Tandem communication network 131 verifies the originating network digital signature for originating communication network 121 with the correct public key. Tandem communication network 131 identifies the user code that indicates that originating communication network 121 verified the calling party digital signature for the calling party identifier. Tandem communication network 131 adds a user/network code (UE/NET SIGN CODE) to the communication session request that indicates that the calling party digital signature for the calling party identifier was verified by originating communication network 121. For example, tandem communication network 131 may add a "11" to the SIP Invite header to indicate that the originating communication network and the calling party identifier were both digitally verified. Tandem communication network 131 digitally signs the communication session request with its private key. Tandem communication network 131 transfers the communication session request having the calling party identifier, the called party identifier, user/network code, and tandem network digital signature to terminating communication network 141.

Terminating communication network 141 verifies the tandem network digital signature for tandem communication network 131 with the correct public key. Terminating communication network 141 transfers the communication session request to UE 105. The communication session request has the calling party identifier, called party identifier, and the user/network code for session origination. Based on the user/network code, UE 105 displays an indication to the called party that indicates that originating communication network 121 and the calling party identifier for UE 101 were both digitally verified.

Referring to FIG. 3 and responsive to the communication session request of FIG. 2, UE 105 transfers a communication session OK that has a calling party identifier for UE 101 and a called party identifier for UE 105. The communication session request may comprise a SIP OK message. UE 105 digitally signs the called party identifier in the communication session OK with its private key. UE 105 transfers the communication session OK having the called party identifier digital signature (UE SIGN) to terminating communication network 141.

Terminating communication network 141 verifies the called party digital signature for the called party identifier using the appropriate public key. Terminating communication network 141 adds a user code (UE SIGN CODE) to the communication session OK that indicates that the called party digital signature for the called party identifier was verified by terminating communication network 141. For example, terminating communication network 141 may add a "1" to a SIP OK header to indicate that the called party identifier was digitally verified. Terminating communication network 141 digitally signs the communication session OK with its private key. Terminating communication network 141 transfers the communication session OK having the calling party identifier, the called party identifier, user code, and terminating network digital signature (NET SIGN) to tandem communication network 131.

Tandem communication network 131 verifies the terminating network digital signature for terminating communication network 141 with the correct public key. Tandem communication network 131 identifies the user code that indicates that terminating communication network 121 verified the called party digital signature for the called party identifier. Tandem communication network 131 adds a user/network code (UE/NET SIGN CODE) to the communication session OK that indicates that the called party digital signature for the called party identifier was verified by terminating communication network 141. For example, tandem communication network 131 may add a "11" to the SIP Invite header to indicate that the terminating communication network and the called party identifier were both digitally verified. Tandem communication network 131 digitally signs the communication session OK with its private key. Tandem communication network 131 transfers the communication session OK having the calling party identifier, the called party identifier, user/network code, and tandem network digital signature to originating communication network 121.

Originating communication network 121 verifies the tandem network digital signature for tandem communication network 131 with the correct public key. Originating communication network 121 transfers the communication session OK to UE 101. The communication session OK has the calling party identifier, called party identifier, and the user/network code for session termination. Based on the user/network code, UE 101 displays an indication to the calling party that indicates that terminating communication network 141 and the called party identifier for UE 105 were both digitally verified.

Figure 4:
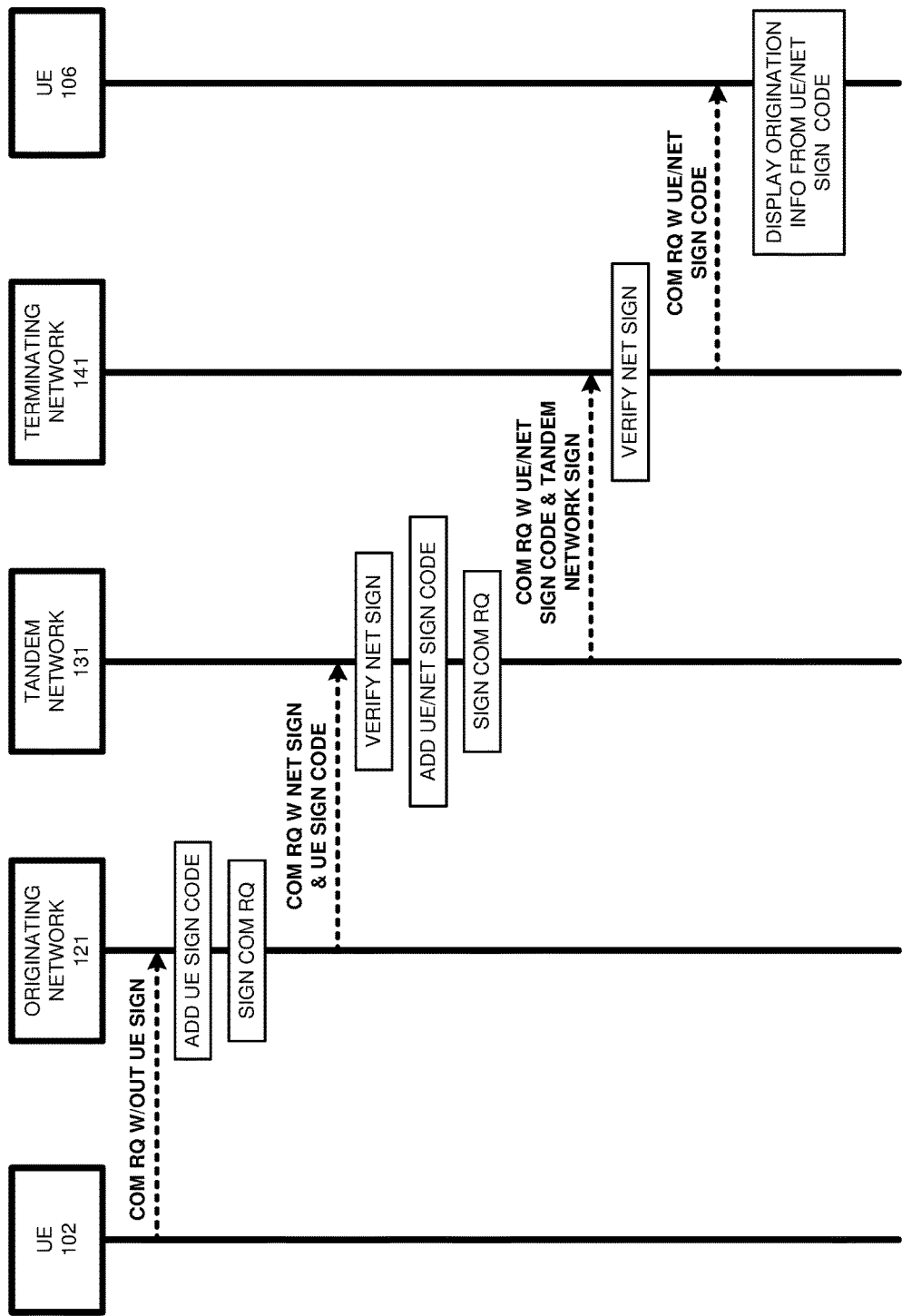
Figure 5:
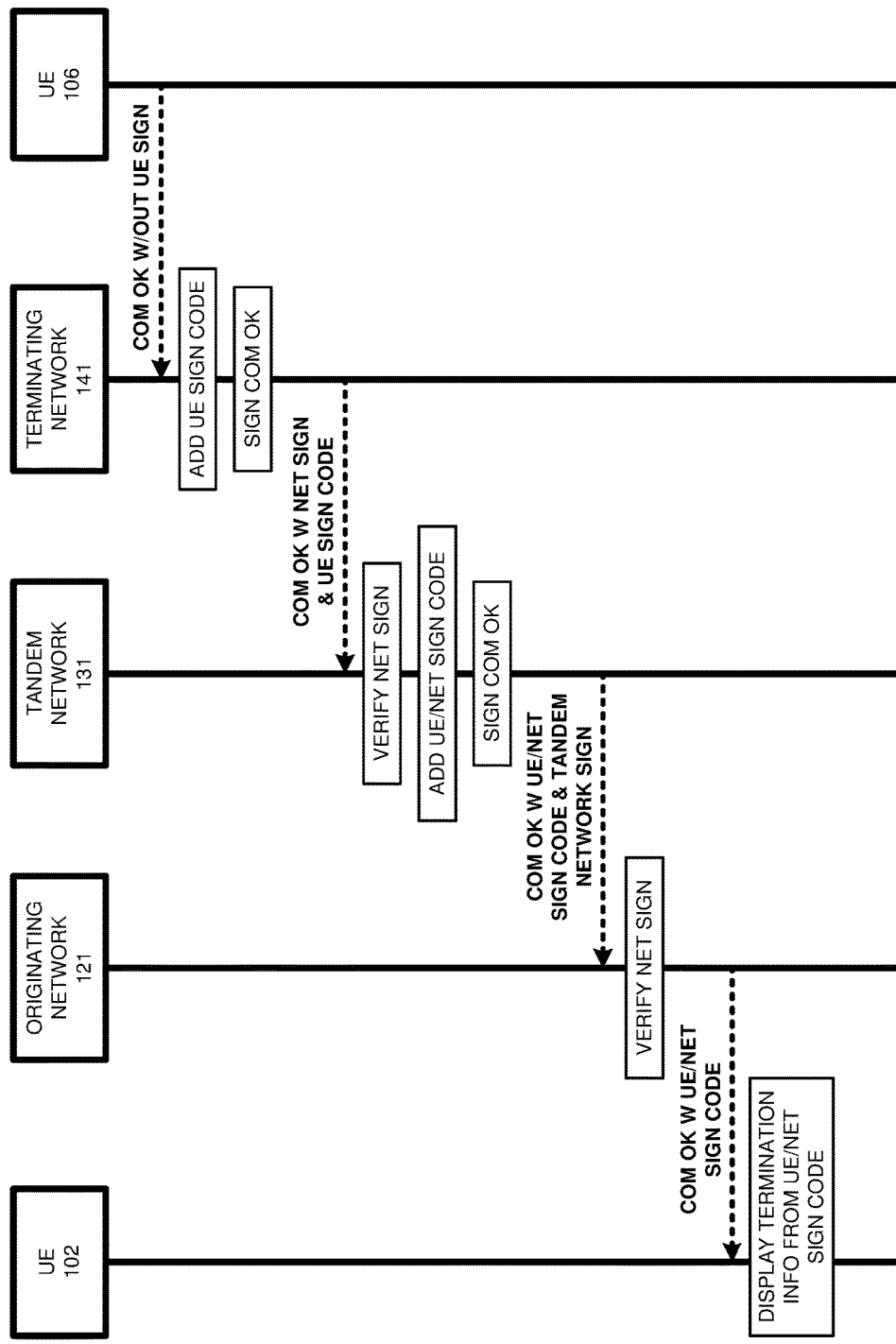

FIGS. 4-5 illustrate a second exemplary communication session. Referring to FIG. 4, UE 102 transfers a communication session request that has a calling party identifier for UE 102 and a called party identifier for UE 106. The communication session request may comprise a SIP Invite message. UE 102 does not digitally sign the calling party identifier in the communication session request. UE 102 transfers the communication session request having the calling party identifier to originating communication network 121. Originating communication network 121 adds a user code (UE SIGN CODE) to the communication session request that indicates that the calling party digital signature for the calling party identifier was not verified by originating communication network 121. For example, originating communication network 121 may add a "0" to a SIP Invite header to indicate that the calling party identifier was not digitally verified. Originating communication network 121 digitally signs the communication session request with its private key. Originating communication network 121 transfers the communication session request having the calling party identifier, the called party identifier, user code, and originating network digital signature to tandem communication network 131.

Tandem communication network 131 verifies the originating network digital signature for originating communication network 121 with the correct public key. Tandem communication network 131 identifies the user code that indicates that originating communication network 121 did not verify the calling party digital signature for the calling party identifier. Tandem communication network 131 adds a user/network code (UE/NET SIGN CODE) to the communication session request that indicates that the calling party digital signature for the calling party identifier was not verified by originating communication network 121. For example, tandem communication network 131 may add a "01" to the SIP Invite header to indicate that the originating communication network was digitally verified but that the calling party identifier was not digitally verified. Tandem communication network 131 digitally signs the communication session request with its private key. Tandem communication network 131 transfers the communication session request having the calling party identifier, the called party identifier, user/network code, and tandem network digital signature to terminating communication network 141.

Terminating communication network 141 verifies the tandem network digital signature for tandem communication network 131 with the correct public key. Terminating communication network 141 transfers the communication session request to UE 106. The communication session request has the calling party identifier, called party identifier, and the user/network code for session origination. Based on the user/network code, UE 106 displays an indication to the called party that indicates that originating communication network 121 was digitally verified but that the calling party identifier for UE 102 was not digitally verified.

Referring to FIG. 5 and responsive to the communication session request of FIG. 4, UE 106 transfers a communication session OK that has a calling party identifier for UE 102 and a called party identifier for UE 106. The communication session request may comprise a SIP OK message. UE 106 does not digitally sign the called party identifier in the communication session OK. UE 106 transfers the communication session OK having the called party identifier to terminating communication network 141.

Terminating communication network 141 adds a user code (UE SIGN CODE) to the communication session OK that indicates that the called party digital signature for the called party identifier was not verified by terminating communication network 141. For example, terminating communication network 141 may add a "0" to a SIP OK header to indicate that the called party identifier was not digitally verified. Terminating communication network 141 digitally signs the communication session OK with its private key. Terminating communication network 141 transfers the communication session OK having the calling party identifier, the called party identifier, user code, and terminating network digital signature to tandem communication network 131.

Tandem communication network 131 verifies the terminating network digital signature for terminating communication network 141 with the correct public key. Tandem communication network 131 identifies the user code that indicates that terminating communication network 121 did not verify the called party digital signature for the called party identifier. Tandem communication network 131 adds a user/network code (UE/NET SIGN CODE) to the communication session OK that indicates that the called party digital signature for the called party identifier was not verified by terminating communication network 141. For example, tandem communication network 131 may add a "01" to the SIP Invite header to indicate that the terminating communication network was digitally verified, but that the called party identifier was not digitally verified. Tandem communication network 131 digitally signs the communication session OK with its private key. Tandem communication network 131 transfers the communication session OK having the calling party identifier, the called party identifier, user/network code, and tandem network digital signature to originating communication network 121.

Originating communication network 121 verifies the tandem network digital signature for tandem communication network 131 with the correct public key. Originating communication network 121 transfers the communication session OK to UE 102. The communication session OK has the calling party identifier, called party identifier, and the user/network code for session termination. Based on the user/network code, UE 102 displays an indication to the calling party that indicates that terminating communication network 141 was digitally verified, but that the called party identifier for UE 106 was not digitally verified.

Figure 6:
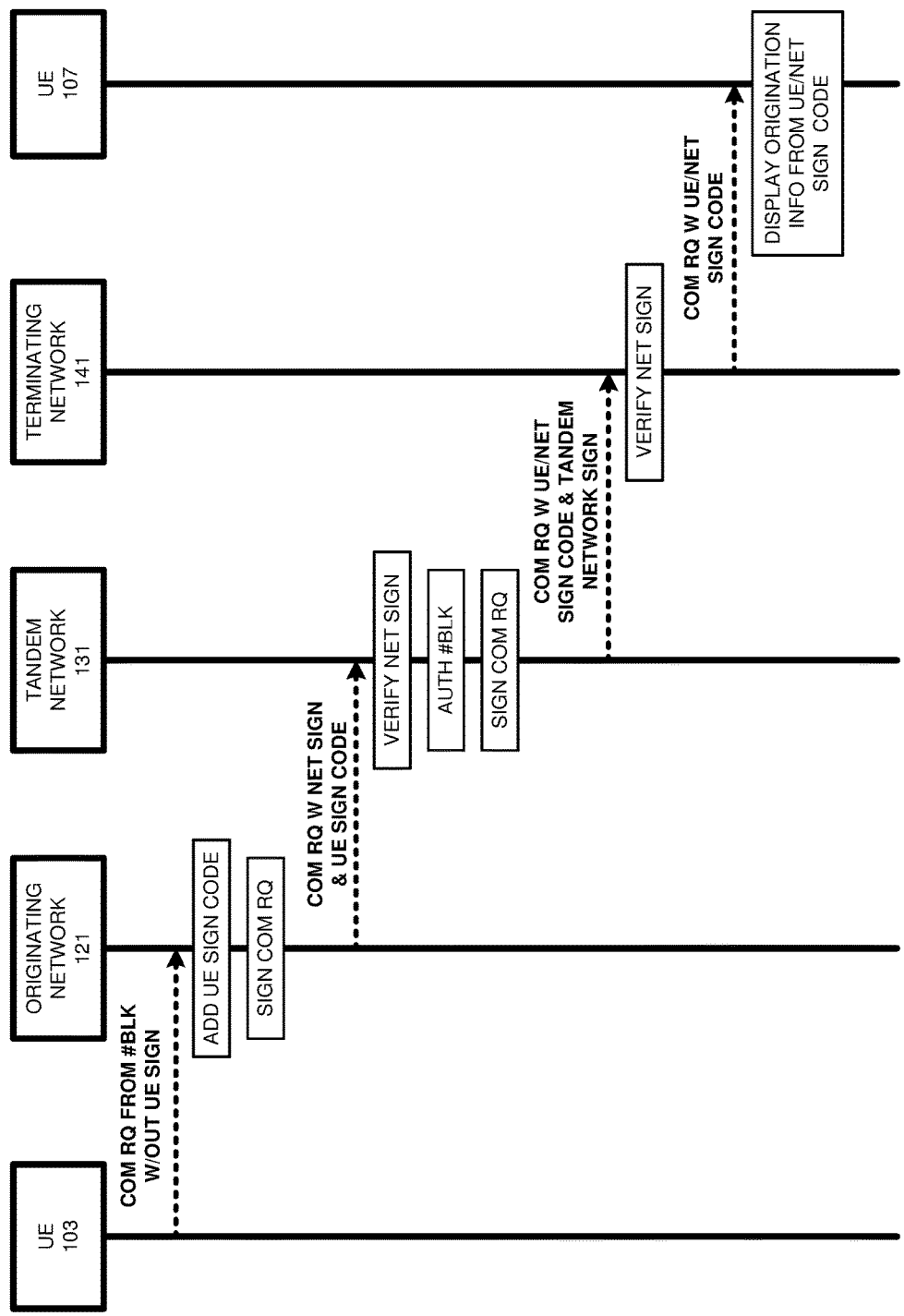
Figure 7:
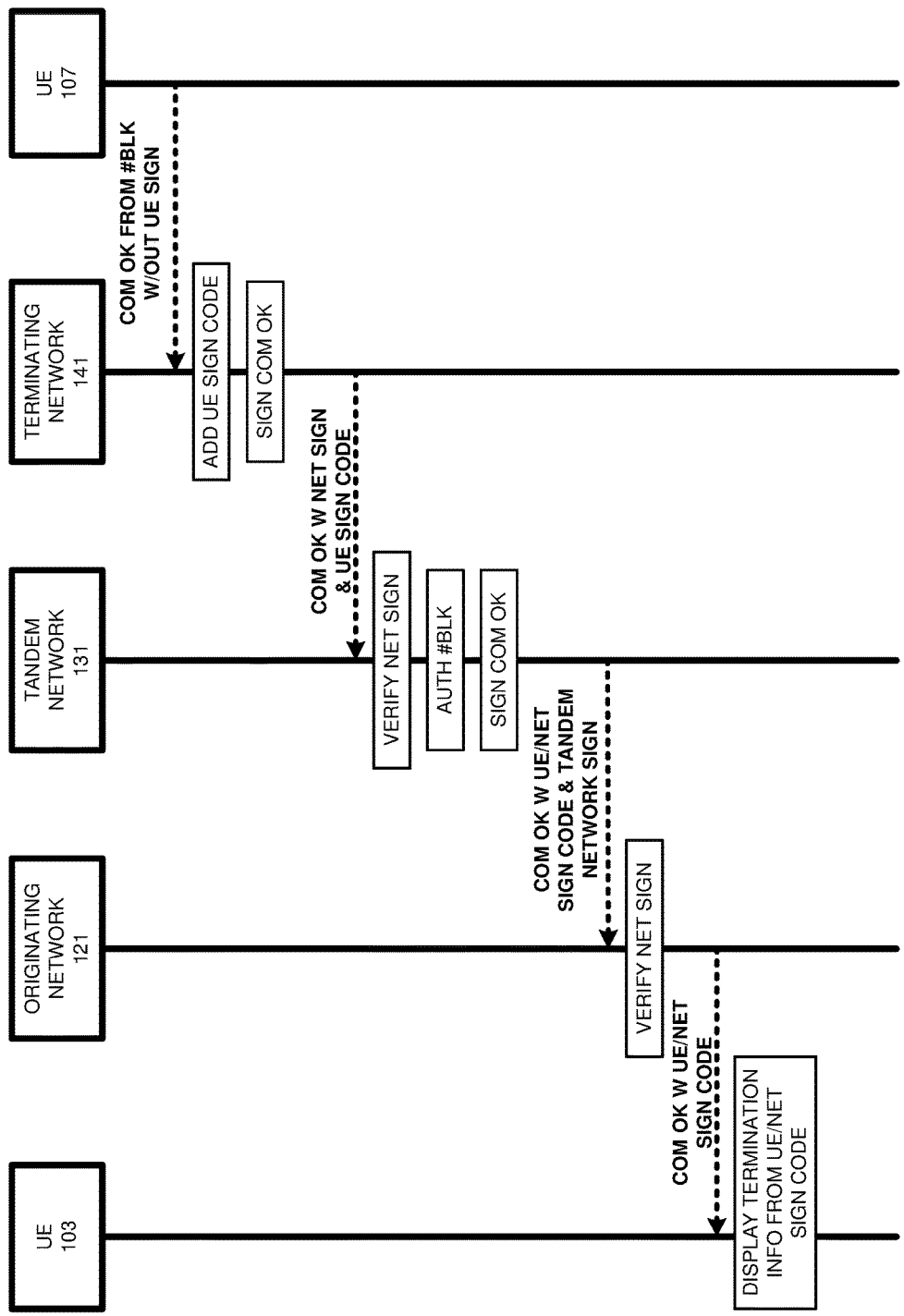

FIGS. 6-7 illustrate a third exemplary communication session. Referring to FIG. 3, UE 103 transfers a communication session request that has a calling party identifier for UE 103 and a called party identifier for UE 107. The communication session request may comprise a SIP Invite message. UE 103 uses a calling party identifier from a valid calling number block. The valid calling number block comprises a set of telephony numbers that were issued by a trusted number authority to a known business entity. UE 103 does not digitally sign the calling party identifier in the communication session request. UE 103 transfers the communication session request to originating communication network 121.

Originating communication network 121 adds a user code (UE SIGN CODE) to the communication session request that indicates that the calling party digital signature for the calling party identifier was not verified by originating communication network 121. For example, originating communication network 121 may add a "0" to a SIP Invite header to indicate that the calling party identifier was not digitally verified. Originating communication network 121 digitally signs the communication session request with its private key. Originating communication network 121 transfers the communication session request having the calling party identifier, the called party identifier, user code, and originating network digital signature to tandem communication network 131.

Tandem communication network 131 verifies the originating network digital signature for originating communication network 121 with the correct public key. Tandem communication network 131 identifies the user code that indicates that originating communication network 121 did not verify the calling party digital signature for the calling party identifier. Tandem communication network 131 determines the calling party identifier is from a valid calling number block that was issued by a trusted number authority to a known business entity. Tandem communication network 131 adds a user/network code (UE/NET SIGN CODE) to the communication session request that indicates that the originating network digital signature was digitally verified, and the calling party identifier is from a valid calling number block, but the calling party identifier was not digitally verified by originating communication network 121. For example, tandem communication network 131 may add a "10" to the SIP Invite header to indicate that the originating communication network was digitally verified, and the calling party identifier is from a valid number block, but the calling party identifier was not digitally verified. Tandem communication network 131 digitally signs the communication session request with its private key. Tandem communication network 131 transfers the communication session request having the calling party identifier, the called party identifier, user/network code, and tandem network digital signature to terminating communication network 141.

Terminating communication network 141 verifies the tandem network digital signature for tandem communication network 131 with the correct public key. Terminating communication network 141 transfers the communication session request to UE 107. The communication session request has the calling party identifier, called party identifier, and the user/network code for session origination. Based on the user/network code, UE 107 displays an indication to the called party that indicates that the originating communication network was digitally verified, and the calling party identifier is from a valid number block, but the calling party identifier was not digitally verified.

Referring to FIG. 7 and responsive to the communication session request of FIG. 6, UE 107 transfers a communication session OK that has a calling party identifier for UE 103 and a called party identifier for UE 107. The communication session request may comprise a SIP OK message. UE 107 uses a called party identifier from a valid number block, but UE 107 does not digitally sign the called party identifier in the communication session OK. UE 107 transfers the communication session OK to terminating communication network 141.

Terminating communication network 141 adds a user code (UE SIGN CODE) to the communication session OK that indicates the calling party identifier was not digitally verified by terminating communication network 141. For example, terminating communication network 141 may add a "0" to a SIP OK header to indicate that the called party identifier was not digitally verified. Terminating communication network 141 digitally signs the communication session OK with its private key. Terminating communication network 141 transfers the communication session OK having the calling party identifier, the called party identifier, user code, and terminating network digital signature to tandem communication network 131.

Tandem communication network 131 verifies the terminating network digital signature for terminating communication network 141 with the correct public key. Tandem communication network 131 identifies the user code that indicates that terminating communication network 121 did not verify the called party digital signature for the called party identifier. Tandem communication network 131 determines the called party identifier is from a valid calling number block that was issued by a trusted number authority to a known business entity. Tandem communication network 131 adds a user/network code (UE/NET SIGN CODE) to the communication session OK that indicates that that the terminating communication network was digitally verified, and the called party identifier is from a valid number block, but the called party identifier was not digitally verified. For example, tandem communication network 131 may add a "10" to the SIP Invite header to indicate that the terminating communication network was digitally verified, and the called party identifier is from a valid number block, but the called party identifier was not digitally verified. Tandem communication network 131 digitally signs the communication session OK with its private key. Tandem communication network 131 transfers the communication session OK having the calling party identifier, the called party identifier, user/network code, and tandem network digital signature to originating communication network 121.

Originating communication network 121 verifies the tandem network digital signature for tandem communication network 131 with the correct public key. Originating communication network 121 transfers the communication session OK to UE 103. The communication session OK has the calling party identifier, called party identifier, and the user/network code for session termination. Based on the user/network code, UE 103 displays an indication to the calling party that indicates that terminating communication network 141 was digitally verified, and the called party identifier is from a valid number block, but the called party identifier for UE 107 was not digitally verified.

Figure 8:
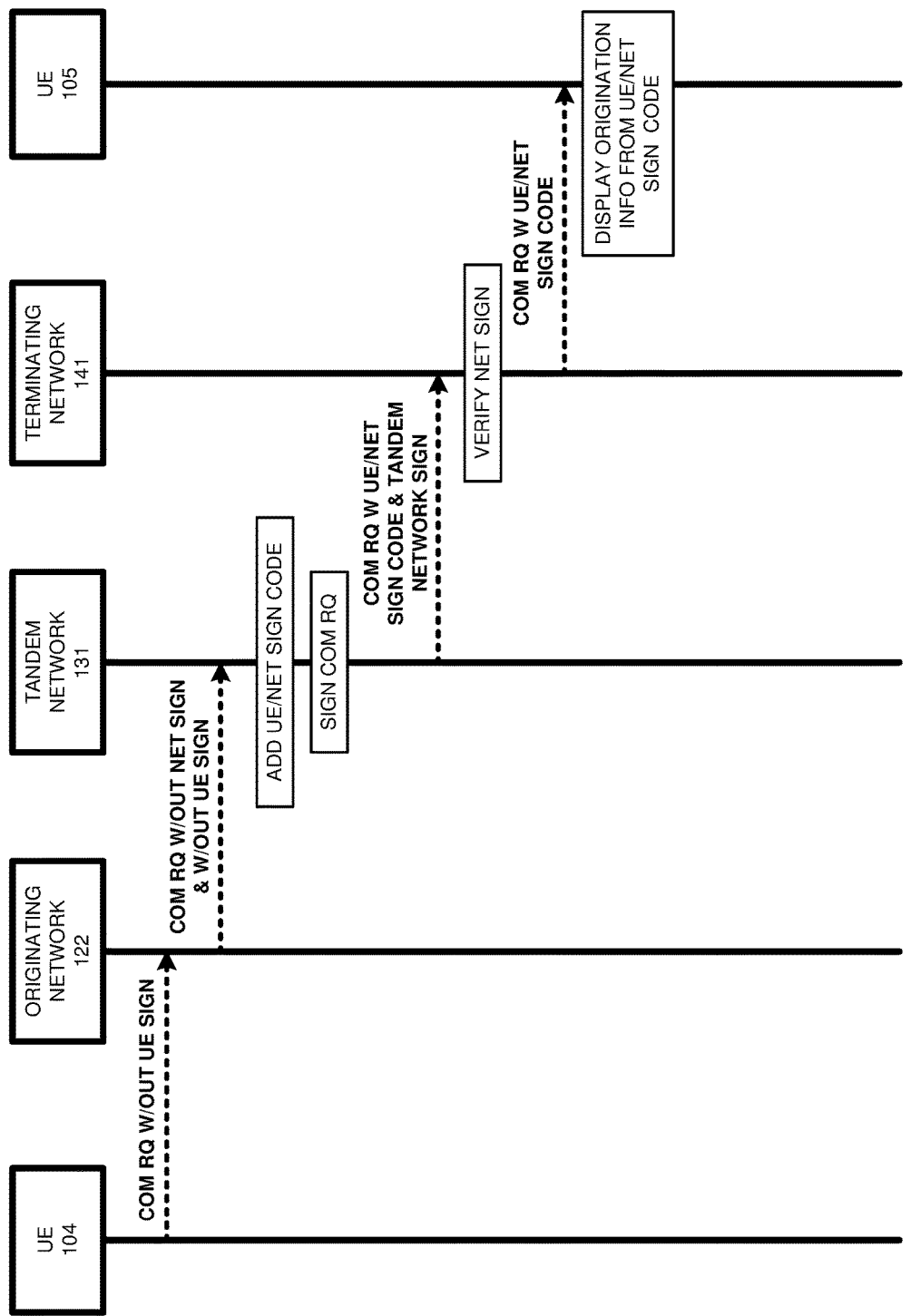

FIG. 8 illustrates a fourth exemplary communication session. UE 104 transfers a communication session request that has a calling party identifier for UE 104 and a called party identifier for UE 105. The communication session request may comprise a SIP Invite message. UE 104 does not digitally sign the calling party identifier in the communication session request. UE 104 transfers the communication session request having the calling party identifier to originating communication network 122. Originating communication network 122 does not digitally sign the communication session request or add a user code. Originating communication network 121 transfers the communication session request having the calling party identifier and the called party identifier to tandem communication network 131.

Tandem communication network 131 adds a user/network code (UE/NET SIGN CODE) to the communication session request that indicates that the calling party digital signature for the calling party identifier was not verified by originating communication network 122 and that the originating network digital signature for originating communication network 122 was not verified by tandem communication network 131. For example, tandem communication network 131 may add a "00" to the SIP Invite header to indicate that neither the originating communication network nor the calling party identifier were digitally verified. Tandem communication network 131 digitally signs the communication session request with its private key. Tandem communication network 131 transfers the communication session request having the calling party identifier, the called party identifier, user/network code, and tandem network digital signature to terminating communication network 141.

Terminating communication network 141 verifies the tandem network digital signature for tandem communication network 131 with the correct public key. Terminating communication network 141 transfers the communication session request to UE 105. The communication session request has the calling party identifier, called party identifier, and the user/network code for session origination. Based on the user/network code, UE 105 displays an indication to the called party that indicates that nether the calling party identifier for UE 104 nor originating communication network 122 were digitally verified.

Figure 9:
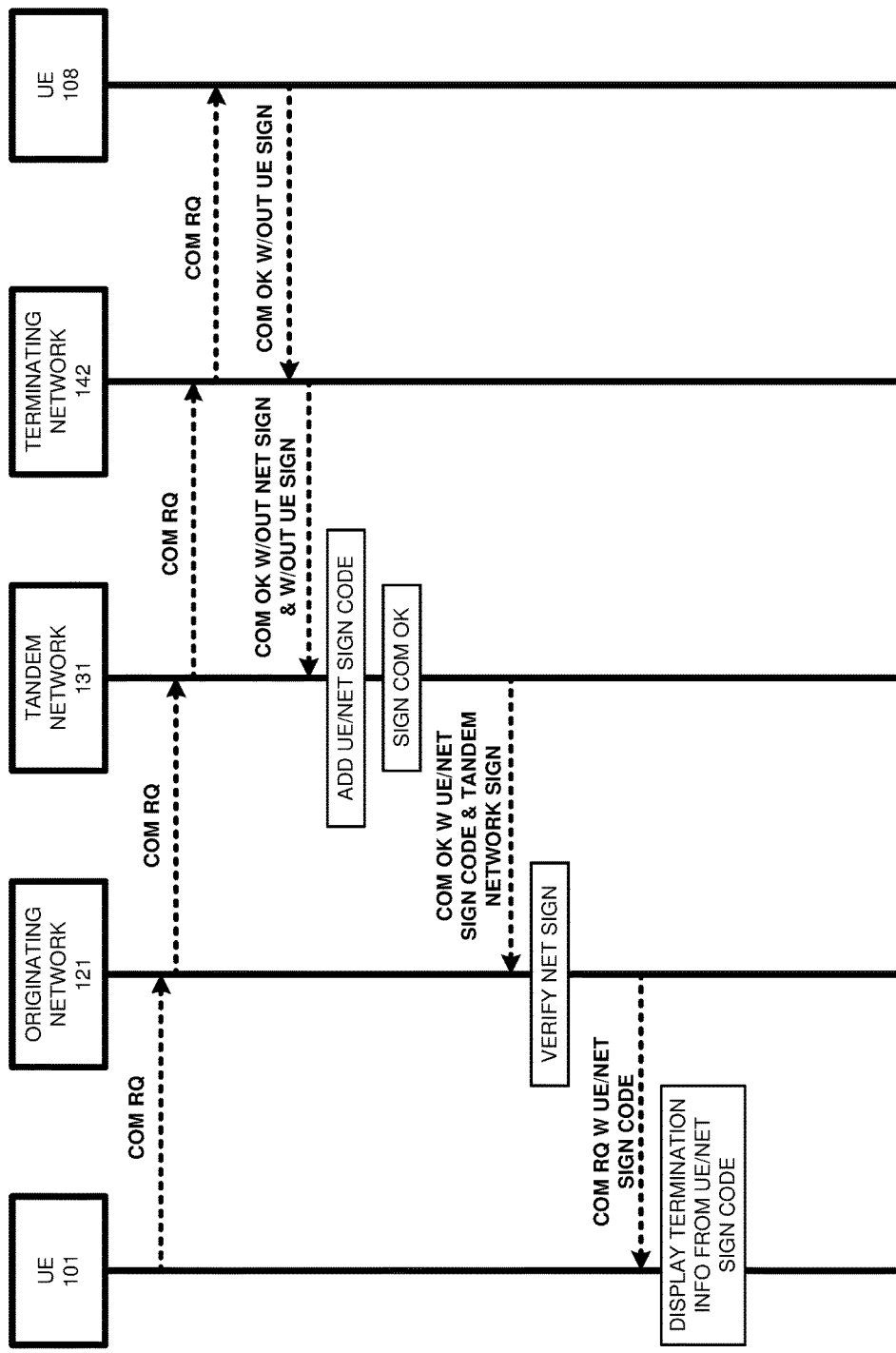

FIG. 9 illustrates a fifth exemplary communication session. A communication request like one of those described above is transferred from UE 101 to originating network 121 for UE 108. Originating communication network 121 transfers the communication session request to tandem communication network 131, and tandem network 131 transfers the communication session request to terminating communication network 142. Terminating communication network 142 transfers the communication session request to terminating UE 108.

UE 108 responds to the communication session request by transferring a communication session OK that has a calling party identifier for UE 101 and a called party identifier for UE 108. The communication session OK may comprise a SIP OK message. UE 108 does not digitally sign the called party identifier in the communication session OK. UE 108 transfers the communication session OK having the called party identifier to terminating communication network 142.

Terminating communication network 142 does not digitally sign the communication session OK and does not add a user code to the communication session OK. Terminating communication network 142 transfers the communication session OK having the calling party identifier and the called party identifier to tandem communication network 131.

Tandem communication network 131 adds a user/network code (UE/NET SIGN CODE) to the communication session OK that indicates that the called party digital signature for the called party identifier was not digitally verified by terminating communication network 141 and that terminating communication network 141 was not digitally verified by tandem communication network 131. For example, tandem communication network 131 may add a "00" to the SIP OK header to indicate that neither the called party identifier nor the terminating communication network were digitally verified. Tandem communication network 131 digitally signs the communication session OK with its private key. Tandem communication network 131 transfers the communication session OK having the calling party identifier, the called party identifier, user/network code, and tandem network digital signature to originating communication network 121.

Originating communication network 121 verifies the tandem network digital signature for tandem communication network 131 with the correct public key. Originating communication network 121 transfers the communication session OK to UE 101. The communication session OK has the calling party identifier, called party identifier, and the user/network code for session termination. Based on the user/network code, UE 101 displays an indication to the calling party that indicates the called party identifier for UE 108 was not digitally verified and that terminating communication network 142 was not digitally verified.

Figure 10:
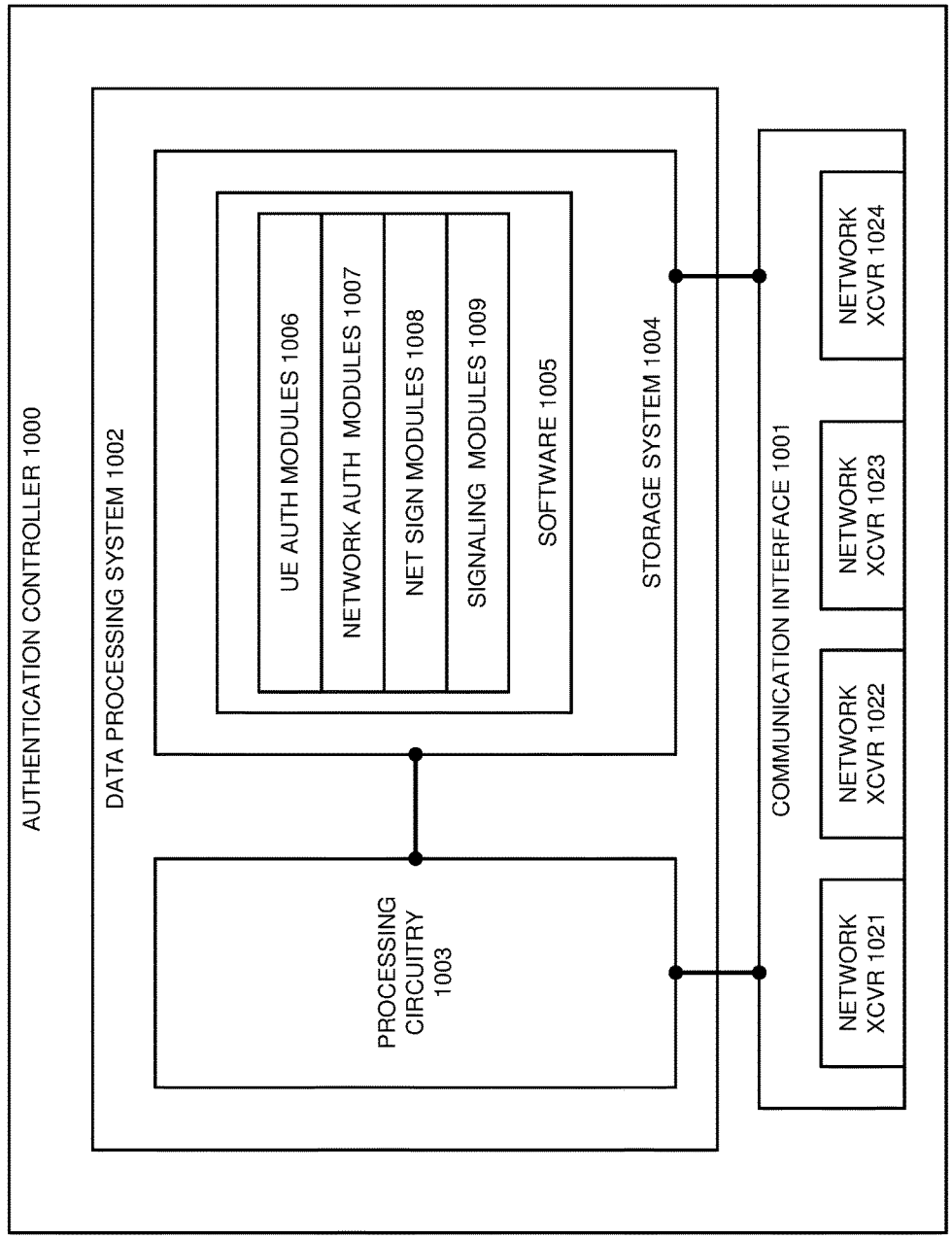
FIG. 10 illustrates an authentication controller to generate and transfer authentication codes for UEs and communication networks.

FIG. 10 illustrates authentication controller 1000 to generate and transfer authentication codes for UEs and communication networks. Authentication controller 1000 is an example of authentication controllers 125, 135, and 145, although these controllers may use alternative configurations and operations. Authentication controller 1000 comprises data communication interface 1001 and data processing system 1002. Data communication interface 1001 comprises data communication transceivers 1021-1024. Data processing system 1002 comprises processing circuitry 1003 and storage system 1004. Storage system 1004 stores software 1005. Software 1005 includes respective software modules 1006-1009.

Transceivers 1021-1024 comprise communication components, such as ports, bus interfaces, signal processors, central processing units, memories, software, and the like. Processing circuitry 1003 comprises server blades, circuit boards, bus interfaces, integrated circuitry, microprocessors, and associated electronics. Storage system 1004 comprises non-transitory, machine-readable, data storage media, such as flash drives, disc drives, memory circuitry, servers, and the like.

Software 1005 comprises machine-readable instructions that control the operation of processing circuitry 1003 when executed. Software 1005 includes software modules 1006-1009. Authentication controller 1000 may be centralized or distributed. All or portions of software 1006-1009 may be externally stored on one or more storage media, such as circuitry, discs, and the like. Some conventional aspects of authentication controller 1000 are omitted for clarity, such as power supplies, enclosures, and the like.

When executed by processing circuitry 1003, software modules 1006-1009 direct circuitry 1003 to perform the following operations. UE authentication modules 1006 verify digital signatures for calling party identifiers and for called party identifiers. UE authentication modules 1006 also determine if calling party identifiers and called party identifiers are from valid number blocks. Network authentication modules 1007 verify digital signatures for other communication networks. Network signature modules 1008 digitally sign communication session requests and OKs with the proper network private keys. Signaling modules 1009 interpret user codes and user/network codes, and add user codes and user/network codes to the communication session requests and OKs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to transfer user/network authentication information for a communication session wherein first originating User Equipment (UE) transfers a first communication session request having a first calling party identifier and a first calling party digital signature for the first calling party identifier, the method comprising:
    a first originating communication network receiving the first communication session request from the first originating UE and verifying the first calling party digital signature for the first calling party identifier;
    the first originating communication network transferring the first communication session request having the first calling party identifier, a first user code indicating that the first calling party identifier was digitally verified by the first originating communication network, and a first originating network digital signature for the first originating communication network;
    a tandem communication network receiving the first communication session request having the first originating network digital signature for the first originating communication network and verifying the first originating network digital signature for the first originating communication network;
    the tandem communication network transferring the first communication session request having the first calling party identifier and a first user/network code indicating that the first calling party identifier was digitally verified by the first originating communication network and that the first originating communication network was digitally verified by the tandem communication network; and
    the tandem communication network receiving a second communication session request for a second originating UE from a second originating communication network without a second user code and without a second originating network digital signature and transferring the second communication session request with a second user/network code indicating that the second originating communication network was not digitally verified by the tandem communication network.

2. The method of claim 1 wherein the first user code consists of one or two bits and the first user/network code consists of one or two bits.

3. The method of claim 1 wherein a third originating UE transfers a third communication session request having a third calling party identifier but not a third calling party digital signature for the third calling party identifier, the method further comprising:
    the first originating communication network receiving the third communication session request from the third originating UE and transferring the third communication session request having the third calling party identifier, a third user code indicating that the third calling party identifier was not verified by the first originating communication network, and the first originating network digital signature for the first originating communication network;
    the tandem communication network receiving the third communication session request having the first originating network digital signature for the first originating communication network and verifying the first originating network digital signature for the first originating communication network; and
    the tandem communication network transferring the third communication session request having the third calling party identifier, and a third user/network code indicating that the third calling party identifier was not digitally verified by the first originating communication network and that the first originating communication network was digitally verified by the tandem communication network.

4. The method of claim 3 wherein the third user code consists of one or two bits and the third user/network code consists of one or two bits.

5. The method of claim 1 wherein a third originating UE transfers a third communication session request having a third calling party identifier but not a third calling party digital signature for the third calling party identifier, and further comprising:
    the first originating communication network receiving the third communication session request from the third originating UE and transferring the third communication session request having the second third calling party identifier, and the first originating network digital signature for the first originating communication network;

the tandem communication network receiving the third communication session request having the first originating network digital signature for the first originating communication network, verifying the third calling party identifier against a valid calling number block, and verifying the first originating network digital signature for the first originating communication network;

the tandem communication network transferring the third communication session request having the third calling party identifier, a third user/network code indicating that the third calling party identifier was in the valid number block and indicating that the first originating communication network was digitally verified by the tandem communication network.

6. The method of claim 5 wherein the third user/network code consists of one or two bits.

7. The method of claim 1 wherein the second user/network code consists of one or two bits.

8. The method of claim 1 wherein the first origination calling party identifier comprises a telephone number.

9. The method of claim 1 wherein the first communication session request comprises a Session Initiation Protocol (SIP) message.

10. A data communication system to transfer user/network authentication information for a communication session wherein first originating User Equipment (UE) transfers a first communication session request having a first calling party identifier and a first calling party digital signature for the first calling party identifier, the data communication system comprising:

a first originating communication network configured to receive the first communication session request from the first originating UE, verify the first calling party digital signature for the first calling party identifier, and transfer the first communication session request having the first calling party identifier, a first user code indicating that the first calling party identifier was digitally verified by the first originating communication network, and a first originating network digital signature for the first originating communication network;

a tandem communication network configured to receive the first communication session request having the first originating network digital signature for the first originating communication network and verify the first originating network digital signature for the first originating communication network, and transfer the first communication session request having the first calling party identifier, and a first user/network code indicating that the first calling party identifier was digitally verified by the first originating communication network and that the first originating communication network was digitally verified by the tandem communication network; and the tandem communication network configured to receive a second communication session request for a second originating UE from a second originating communication network without a second user code and without a second originating network digital signature and transfer the second communication session request having a second user/network code indicating that the second originating UE was not digitally verified by the second originating communication network that the second originating communication network was not digitally verified by the tandem communication network.

11. The data communication system of claim 10 wherein the first user code consists of one or two bits and the first user/network code consists of one or two bits.

12. The data communication system of claim 10 wherein a third originating UE transfers a third communication session request having a third calling party identifier but not a third calling party digital signature for the third calling party identifier, the data communication system further comprising:

the first originating communication network configured to receive the third communication session request from the third originating UE and transfer the third communication session request having the third calling party identifier, a third user code indicating that the third calling party identifier was not verified by the first originating communication network, and the first originating network digital signature for the first originating communication network;

the tandem communication network configured to receive the second third communication session request having the first originating network digital signature for the first originating communication network, verify the first originating network digital signature for the first originating communication network, and transfer the third communication session request having the third calling party identifier, and a third user/network code indicating that the third calling party identifier was not digitally verified by the first originating communication network and that the first originating communication network was digitally verified by the tandem communication network.

13. The data communication system of claim 12 wherein the third user code consists of one or two bits and the third user/network code consists of one or two bits.

14. The data communication system of claim 10 wherein a third originating UE transfers a third communication session request having a third calling party identifier but not a third calling party digital signature for the third calling party identifier, and further comprising:

the first originating communication network configured to receive the third communication session request from the third originating UE and transfer the third communication session request having the third calling party identifier and the first originating network digital signature for the first originating communication network;

the tandem communication network configured to receive the third communication session request having the first originating network digital signature for the first originating communication network, verify the first originating network digital signature for the first originating communication network, verify the third calling party identifier against a valid calling number block, and transfer the third communication session request having the third calling party identifier, a third user/network code indicating that the third calling party identifier was in the valid number block and indicating that the first originating network was digitally verified by the tandem communication network.

15. The data communication system of claim 14 wherein the third user/network code consists of one or two bits.

16. The data communication system of claim 10 wherein the second user/network code consists of one or two bits.

17. The data communication system of claim 10 wherein the first origination calling party identifier comprises a telephone number.

18. The data communication system of claim 10 wherein the first communication session request comprises a Session Initiation Protocol (SIP) message.

\* \* \* \* \*